2,845,459

PREPARATION OF PENTAALKYLGUANIDINES

Hans Z. Lecher, Plainfield, and Elizabeth M. Hardy, Bound Brook, N. J., and Clement L. Kosloski, North Easton, Mass., assignors to American Cyanamid Company, New York, N. Y., a corporation of Maine No Drawing. Application May 21, 1956
Serial No. 585,972

17 Claims. (Cl. 260—564)

This invention relates to a novel process for preparing pentaalkylguanidines. More particularly, it relates to the reaction of C-chloro-N,N,N'-trimethylformamidine hydrochloride and dialkylamines to form valuable pentaalkylguanidines.

Pentaalkylguanidines are uniquely powerful liquid solvents, miscible with polar and non-polar solvents. For example, difficulty soluble anthraquinone is easily dissolved by pentamethylguanidine. Additionally, the pentaalkylguanidines are strong bases. The simplest member, pentamethylguanidine, possesses a pKa value equal to 13.8. Because these compounds demonstrate strong basicity and good solubilizing characteristics, they are useful as acid-binding agents. Additionally, pentaalkylguanidines react easily with sulfur trioxide to form addition products as disclosed in U. S. Letters Patent 2,655,528.

It has been known that pentaalkylguanidines can be caused to form by the reaction of S-alkyl-isothioureas and dialkylamines. However, elevated temperatures, pressures and the presence of mercuric chloride as the effective catalyst were required to cause reaction. In the absence of these drastic conditions of temperature, pressure and catalyst, pentaalkylguanidines do not form. Although to the present, this has been the accepted method of producing pentaalkylguanidines, this process is not well suited for commercial production. There has long existed a need for a process more commercially satisfactory. Consequently, if a commercially suitable process could be developed, it would be highly desirable.

It is an object of the present invention, therefore to devise a process for preparing pentaalkylguanidines in the absence of high temperatures, pressures and catalysts. According to the present invention, this object is accomplished surprisingly and expeditiously by aminating a C-chloro-N,N,N'-trimethylformamidine salt such as the hydrochloride. Other objects and advantages will become apparent from the ensuing detailed description.

This amination and other objects can be advantageously attained by causing C-chloro-N,N,N'-trimethylformamidine hydrochloride to react with a secondary alkylamine in the presence of an inert anhydrous diluent. Since the C-chloro-N,N,N'-trimethylformamidine hydrochloride has not been previously available, it is believed that the present overall reaction is new.

According to the process of the present invention, it has been found that C-chloro-N,N,N'-trimethylformamidine hydrochloride reacts smoothly with dialkylamines, yielding pentaalkylguanidines in good yield. The reaction may be represented by the following general equation:

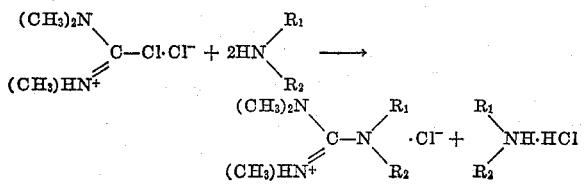

wherein $R_1$ and $R_2$ stand for the same or different alkyl radicals of from one to four carbon atoms.

Effective reaction requires an inert anhydrous diluent, such as benzene or a substituted benzene, preferably nitrobenzene. Nitrobenzene is particularly useful because it not only dissolves the C-chloro-N,N,N'-trimethylformamidine hydrochloride, the dialkylamine and resultant pentaalkylguanidine hydrochloride product, but formed dialkylamine hydrochloride product is substantially insoluble therein. Thereby, the collection of the pentaalkylguanidine hydrochloride reaction product is facilitated. If so desired, the free base can thereafter be obtained by conventional saponification with an alkaline material such as the alkali and alkaline earth metal hydroxides. Illustrative of the latter are sodium hydroxide, potassium hydroxide, lithium hydroxide, barium hydroxide and calcium hydroxide.

Reaction occurs with ease. Preferably, it should not be initiated at above about 80° C. in order to avoid possible excessive decomposition of the chloroformamidine salt. In general, the wide temperature range of from about 20° C. to about 100° C. is suited for the successful practice of the described process.

The novel C-chloro-N,N,N'-trimethylformamidine hydrochloride reactant can be prepared by the addition of S-methyl or S-ethyl-N,N,N'-trimethylisothiourea to an excess of chlorine in an inert anhydrous solvent such as carbon tetrachloride. The method is described in detail in a copending application, Serial No. 585,939, filed on even date.

It is an advantage of the invention that the reaction may utilize substantially any dialkylamine reactant. However, those which contain alkyl radicals of from 1–4 carbon atoms are preferred. The alkyl groups can be the same or different. Typical examples include: dimethylamine, diethylamine, ethyl-methylamine, propyl-methylamine and di-n-butylamine.

It is also an advantage of the process that the molar proportions of C-chloro-N,N,N'-trimethylformamidine hydrochloride to the dialkylamine used are not particularly critical. Any amounts up to the solubility limit can be used. Large excess amounts of either reactant should be avoided, but a slight excess of the dialkylamine over the hydrochloride can be advantageously employed.

The invention will be further illustrated by the following examples, which are not intended to be limitative. Unless otherwise stated, the parts given are by weight.

EXAMPLE 1

*C-chloro-N,N,N'-trimethylformamidine hydrochloride preparation*

240 parts of dry carbon tetrachloride is saturated with chlorine at 0° C. A solution of 6.7 parts of S-methyl-N,N,N'-trimethylisothiourea in 40 parts of dry carbon tetrachloride is gradually added to the agitated chlorine solution, the temperature of the reaction mixture being kept at from 0° C. to 10° C. Pale yellow crystals separate immediately. The agitated mixture is allowed to reach room temperature and kept there until the reaction is complete. The product is isolated by filtration and washed with carbon tetrachloride. At first it is a light yellow, but it becomes colorless on drying in vacuo. The yield is almost quantitative. The melting point of the C-chloro-trimethylformamidine hydrochloride is 69° C. to 71° C.

EXAMPLE 2

*Pentamethylguanidine preparation*

17.1 parts of C-chloro-N,N,N'-trimethylformamidine hydrochloride as prepared in Example 1 is dissolved in 90 parts of nitrobenzene. This solution is gradually added to the orange-colored agitated solution of 18.3 parts of anhydrous dimethylamine in 60 parts of nitrobenzene at 10° C.–20° C. After the addition has been completed, the mixture is heated to 100° C. to complete the reaction. Simultaneously, the excess dimethylamine is driven off and recovered. After cooling, the insoluble dimethylamine hydrochloride is filtered off. The filtrate is extracted with dilute hydrochloric acid and this aqueous extract is evaporated to syrup consistency. The pentamethylguanidine base is obtained with the aid of sodium hydroxide and extracted with benzene. Fractional distillation furnishes pentamethylguanidine in good yield; it has a boiling point of 157° C.–158° C.

EXAMPLE 3

*N,N-diethyl-N',N',N''-trimethylguanidine preparation*

7.86 parts of C-chloro-N,N,N'-trimethylformamidine hydrochloride is added to an agitated solution of 21.94 parts of anhydrous diethylamine in 88 parts of benzene. A slightly exothermic reaction ensues. The mixture is stirred until the temperature drops and then heated to reflux and kept refluxing until the reaction is complete. After cooling the reaction mixture, solid potassium hydroxide together with a small amount of water is added to obtain the guanidine base. The benzene solution is filtered from the salt and distilled. N,N-diethyl-N',N',-N''-trimethylguanidine is obtained in good yield; B. P. 71° C.–72° C. (15 mm.). The picrate melts at 126° C.–126.5° C.

In a manner substantially identical with the procedure of Example 2, various dialkylamines, such as ethyl-methylamine, propylmethylamine and di-n-butylamine amongst others can be readily substituted for the diethylamine of that example.

When methanol is employed during reaction as the solvent, the yield of resultant guanidine is low. Trimethylurea is also found as a contaminant. The simultaneous formation of trimethylurea appears to indicate that some methanolysis of the C-chloro-N,N,N'-trimethylformamidine hydrochloride has occurred.

We claim:
1. A process for preparing a pentaalkylguanidine which comprises: reacting C-chloro-N,N,N'-trimethylformamidine hydrochloride with a dialkylamine in an inert anhydrous diluent, converting thus-formed pentaalkylguanidine hydrochloride to the free base, and recovering said pentaalkylguanidine.

2. A process according to claim 1 in which the dialkylamine is dimethylamine.
3. A process according to claim 1 in which the dialkylamine is diethylamine.
4. A process according to claim 1 in which the dialkylamine is ethyl-methylamine.
5. A process according to claim 1 in which the dialkylamine is propylmethylamine.
6. A process according to claim 1 in which the dialkylamine is di-n-butylamine.
7. A process according to claim 1 in which the inert anhydrous diluent is nitrobenzene.
8. A process for preparing a pentaalkylguanidine which comprises: reacting C-chloro-N,N,N'-trimethylformamidine hydrochloride with a dialkylamine in nitrobenzene at a temperature between 20° C. and 100° C. while agitating the mixture, cooling and filtering the latter to remove insolubles, recovering desired pentaalkylguanidine hydrochloride in solution, and converting the hydrochloride to the free base by the use of a strong alkylizing agent.
9. A process according to claim 8 in which the alkylizing agent is sodium hydroxide.
10. A process according to claim 8 in which the alkylizing agent is potassium hydroxide.
11. A process according to claim 8 in which the dialkylamine is dimethylamine.
12. A process according to claim 8 in which the dialkylamine is diethylamine.
13. A process according to claim 8 in which the dialkylamine is ethyl-methylamine.
14. A process according to claim 8 in which the dialkylamine is propylmethylamine.
15. A process according to claim 8 in which the dialkylamine is di-n-butylamine.
16. In a process for preparing a pentaalkylguanidine which comprises the step of reacting the reactants: C-chloro-N,N,N'-trimethylformamidine hydrochloride with a dialkylamine in an inert anhydrous diluent.
17. A process according to claim 16 in which the inert anhydrous diluent is nitrobenzene.

References Cited in the file of this patent

Lecher et al.: Berichte, vol. 56, pages 1326–30 (page 1327 relied on).